(12) United States Patent
Kenda et al.

(10) Patent No.: US 7,301,643 B2
(45) Date of Patent: Nov. 27, 2007

(54) ARRANGEMENT FOR BUILDING A MINIATURIZED FOURIER TRANSFORM INTERFEROMETER FOR OPTICAL RADIATION ACCORDING TO THE MICHELSON PRINCIPLE OR A PRINCIPLE DERIVED THEREFROM

(75) Inventors: Andreas Kenda, Klagenfurt (AT); Werner Scherf, Villach (AT); Marin Kraft, Villach (AT); Harald Schenk, Dresden (DE)

(73) Assignees: CTR Carinthian Tech Research AG, Magdalen (AT); Fraunhofer-Gesellschaft zur Forderung der Angewandten Forschunge E.V., Munich (DE)

( * ) Notice: Subject to any disclaimer, the term of this patent is extended or adjusted under 35 U.S.C. 154(b) by 235 days.

(21) Appl. No.: 11/113,068

(22) Filed: Apr. 25, 2005

(65) Prior Publication Data
US 2006/0098204 A1 May 11, 2006

(30) Foreign Application Priority Data
Jun. 24, 2004 (AT) .............................. A 1078/2004

(51) Int. Cl.
*G01B 9/02* (2006.01)
*G01J 3/45* (2006.01)
(52) U.S. Cl. ..................................... 356/452
(58) Field of Classification Search ................ 356/451, 356/452, 453, 454, 455, 456
See application file for complete search history.

(56) References Cited

U.S. PATENT DOCUMENTS

| | | | | |
|---|---|---|---|---|
| 5,675,413 A * | 10/1997 | Prikryl et al. | ............... | 356/508 |
| 5,963,322 A * | 10/1999 | Rapp et al. | ................. | 356/451 |
| 6,747,742 B1* | 6/2004 | Verma | ......................... | 356/454 |
| 2002/0176085 A1* | 11/2002 | Hill | ............................ | 356/452 |
| 2003/0103210 A1* | 6/2003 | Rapp et al. | ................. | 356/456 |

* cited by examiner

Primary Examiner—Michael A. Lyons
(74) Attorney, Agent, or Firm—Young & Thompson

(57) ABSTRACT

An arrangement for building a compact Fourier transform interferometer for optical radiation according to the Michelson principle or a principle derived therefrom. According to the invention, this arrangement is characterized in that the optical modulation of the radiation in at least one of the interferometer arms is produced by the translational displacement of micromechanical translation mirrors that are optically accessible on one side or on both sides, with an effective oscillation amplitude of at least 50 μm and a usable mirror surface area of at least 1 mm². In doing so, the micromechanical mirror components according to the invention assume the function of known movable mirrors so that by using an almost massless microcomponent in comparison to conventional systems, a much smaller size and a mirror modulation frequency that is several orders of magnitude higher can be achieved. The arrangement according to the invention is used especially for optical spectroscopy.

18 Claims, 3 Drawing Sheets

ARRANGEMENT FOR BUILDING A MINIATURIZED FOURIER TRANSFORM INTERFEROMETER FOR OPTICAL RADIATION ACCORDING TO THE MICHELSON PRINCIPLE OR A PRINCIPLE DERIVED THEREFROM

FIELD OF THE INVENTION

The invention relates to an arrangement for building a compact Fourier transform (FT) interferometer for optical radiation according to the Michelson principle or a principle derived therefrom.

DESCRIPTION OF PRIOR ART

The use of a Michelson interferometer or a subform of it, such as a Michelson-Morely or Kapp-Genzel interferometer, in optical spectroscopy, instead of, for example, a grating monochromator, is prior art and is demonstrated by a host of literature citations and patents and is implemented in products of a series of manufacturers. The emphasis here is on the spectral ranges of the near and mid-infrared (FT-NIR, FT-IR). Optical FT systems are used in practice in a plurality of applications, but in this case, these are generally off-line applications, in most cases in combination with sampling. For in-line measurements or mobile applications, the commercially available devices are usually too large, too heavy, not durable enough, and too expensive. Especially for larger distances between the measurement site and the apparatus position or in mid-infrared, linkage via optical fibers is only possible in special cases. For these reasons, IR devices for a long time have covered only a small portion of possible applications. A light, economical FT spectrometer that is as compact as possible that could be used, for example, in a decentralized manner on various system parts for process tracking would significantly expand applicability here. Another limitation of standard FT systems is the maximum scanner speed or time resolution that is limited primarily by the moment of inertia of the macroscopic mirror. For tracking of transient systems with time constants of typically <1 ms, which currently cannot be studied or can only be studied at high cost depending on time, a compact system with a mirror component that is almost free of inertia due to miniaturization and a correspondingly higher attainable modulation frequency would be of interest. Likewise, such a measurement device for systems in which as large a number of "scans" as possible are to be recorded within a short time, for example for improving the signal-to-noise ratio without influencing the measurement signal by equipment time drift, would be advantageous.

Isolated approaches to a compact configuration of FT interferometers are known in the literature, but for a long time have remained limited to purely academic applications. An approach to the development of a miniature FT interferometer (Collins et al., Optics Letters 24, 1999) is based on guides that have been etched out of pure silicon crystals along the (111) surfaces, in which a magnetically operated carriage with a mirror seated on it is moved. The system enables displacement paths of a few centimeters and correspondingly high optical resolutions, and, for mirror surfaces that are relatively large for practical application, it is compact and durable due to the small attainable production tolerances. Here, in particular, the clearly below-average attainable mirror speeds militate against practical use.

Another approach is based on the use of a miniature mirror that is moved via an electrostatically driven comb structure that is aligned normally with the direction of oscillation (Manzardo et al., Optics Letters 24, 1999; Manzardo, Dissertation, Univ. Neuchatel/CH 2002). The system published there is, however, not suitable for practical use in a spectrometer application due to the low attainable adjustment path of <40 µm, but mainly due to the small mirror surface area of <0.04 mm$^2$.

Here, the invention is designed to correct this.

BRIEF SUMMARY OF THE INVENTION

According to the invention, an arrangement of the initially-mentioned type is proposed that is characterized in that the optical modulation of the radiation in at least one of the interferometer arms is caused by translational displacement of a micromechanical translation mirror that is optically accessible on one side or on both sides, with an effective oscillation amplitude of at least 50 µm and a usable mirror surface area of at least 1 mm$^2$.

Other advantageous embodiments of the arrangement according to the invention are disclosed according to the subclaims.

In contrast to the known solutions, this invention is characterized by the use of a novel micromechanical translation mirror element that oscillates harmonically depending on the component within the range of 200 Hz-20 kHz, with a typical mirror surface area of 1×1 mm$^2$ or more and a usable oscillation amplitude of at least 50 µm, typically 100 µm or more, according to an attainable adjustment path of at least 100 µm, typically 200 µm or more. The micromechanical mirror element used is suspended on silicon springs that are electrostatically made to oscillate normally to the mirror plane via comb electrodes that lie in a coplanar manner. This type of suspension and oscillation excitation of the mirror make it possible for the first time, without undue deformation of the planar mirror element, to implement the high deflections that are necessary for practical use as well as a large enough mirror surface area of at least 1 mm$^2$ in a micromechanical translation mirror element, and on that basis, to build a practicable FT interferometer for example for use in an FT spectrometer.

The invention relates furthermore to possible embodiments of the arrangement according to the invention that are characterized essentially in that at least one harmonically oscillating micromechanical translation mirror element is used with an oscillation amplitude and mirror surface area that are large for a micromodule, and which mirror surface area produces the optical modulation that is required for a two-beam Michelson interferometer by the translational oscillation.

BRIEF DESCRIPTION OF THE DRAWINGS

Possible embodiments of the arrangement according to the invention are explained in more detail using FIGS. 1a, 1b, 2, 3, and 4.

Here.

Furthermore.

DETAILS OF THE EMBODIMENTS

Figure 1A:
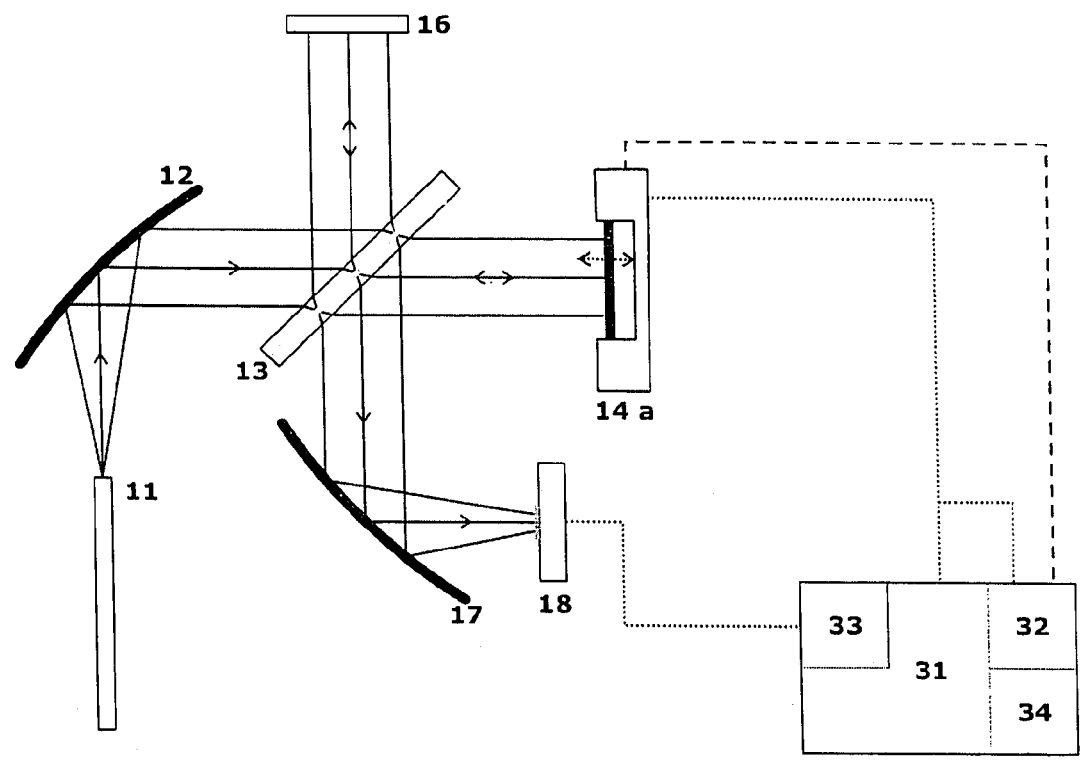
FIG. 1a shows a possible embodiment of the arrangement according to the invention using an oscillating micromechanical translation mirror component that is optically accessible on one side. The position determination of the mirror component takes place in this arrangement via sensors that are integrated into the micromechanical component.
Figure 1B:
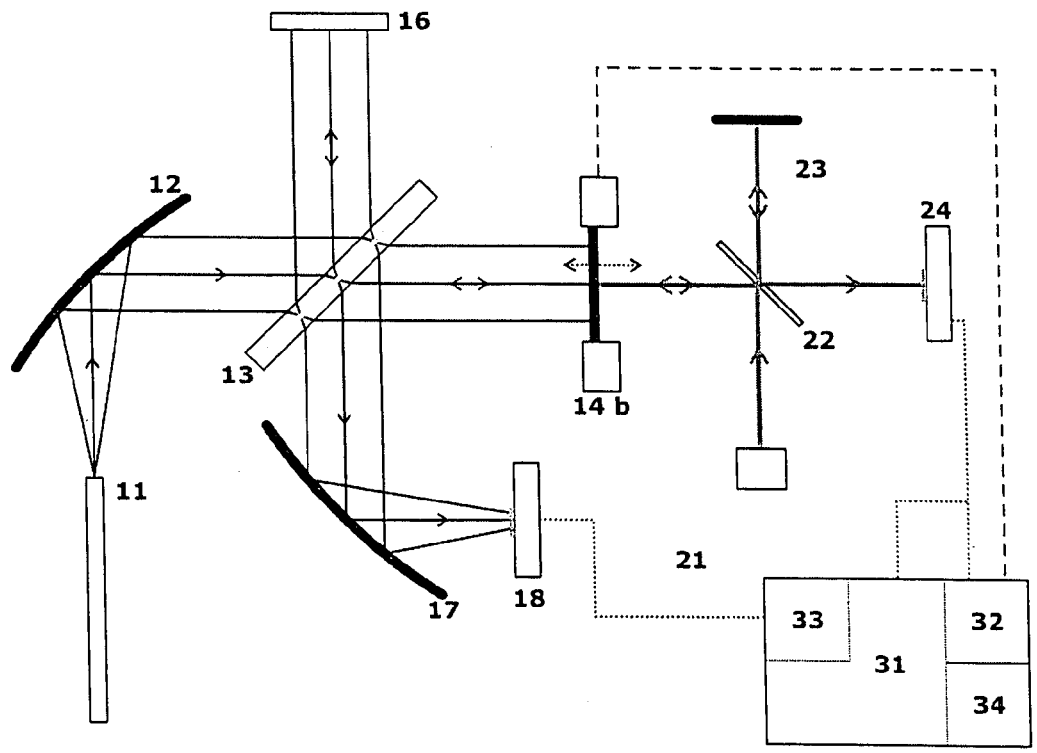
FIG. 1b shows a possible embodiment of the arrangement according to the invention using an oscillating micromechanical translation mirror component that is optically accessible on both sides. In this case, the position determination of the mirror takes place via a reference laser interferometer.

In the first basic arrangement, as is shown in FIGS. 1a and 1b, an individual micromechanical translation mirror module (14a) or (14b) is used for modulation of the radiation in an interferometer branch, while the second interferometer branch that is located preferably mirror-symmetrically to the first branch contains a locally fixed mirror (16) instead of the oscillation mirror. The interrogation of the mirror position data that are necessary for inverse transformation of the interferogram (path domain) recorded by the detector into a spectrum (frequency domain) can take place selectively via (i) position sensors that are integrated into the mirror component, for example capacitive passage sensors, (ii) a reference laser interferometer as is shown in FIG. 1b, and in this case the micromechanical mirror module must be suspended such that the two mirror surfaces are optically accessible, or (iii) a combination of the two processes.

Figure 2:
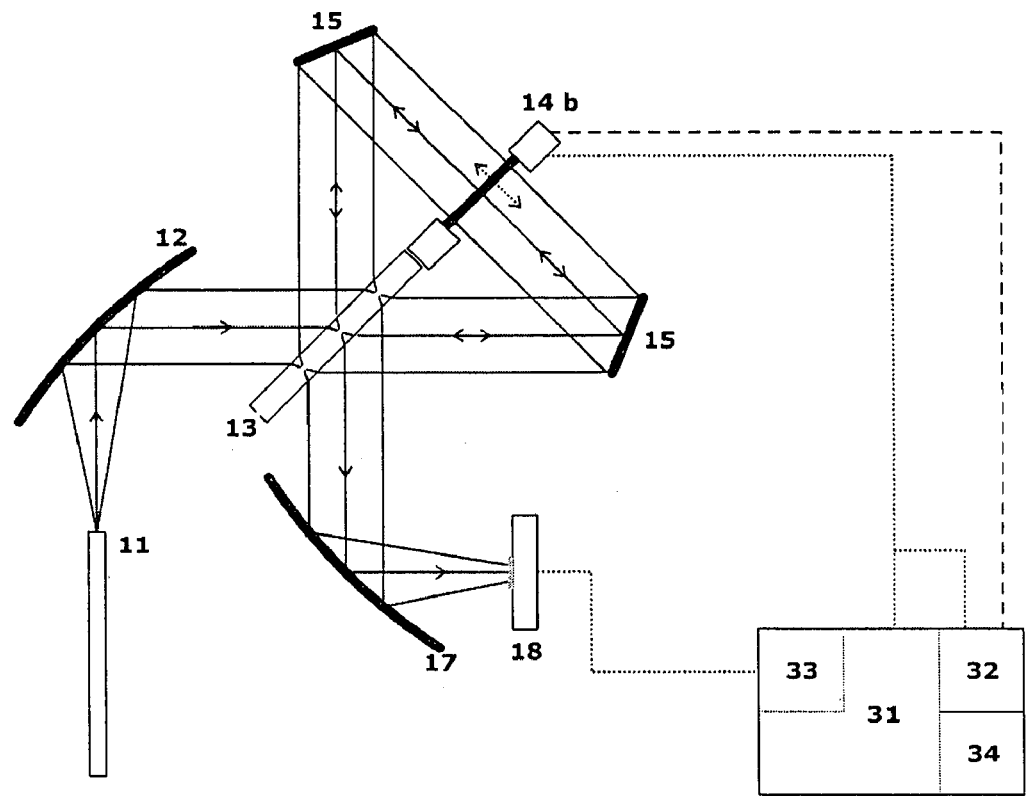
FIG. 2 shows a possible embodiment of the arrangement according to the invention using an oscillating micromechanical translation mirror component that is optically accessible on both sides for simultaneous modulation of the radiation in the two interferometer arms.

In the second basic arrangement as shown in FIG. 2, a micromechanical translation mirror module (14b) that is optically accessible on both sides is used and modulates the two component interferometer beams at the same time according to the Happ-Genzel principle. In this way, the optical path difference is doubled and thus the resolution is improved using only one micromechanical component. Interrogation of the mirror position data takes place in a structure of this type preferably via, for example, capacitive position sensors that are integrated into the micromirror module.

Figure 3:
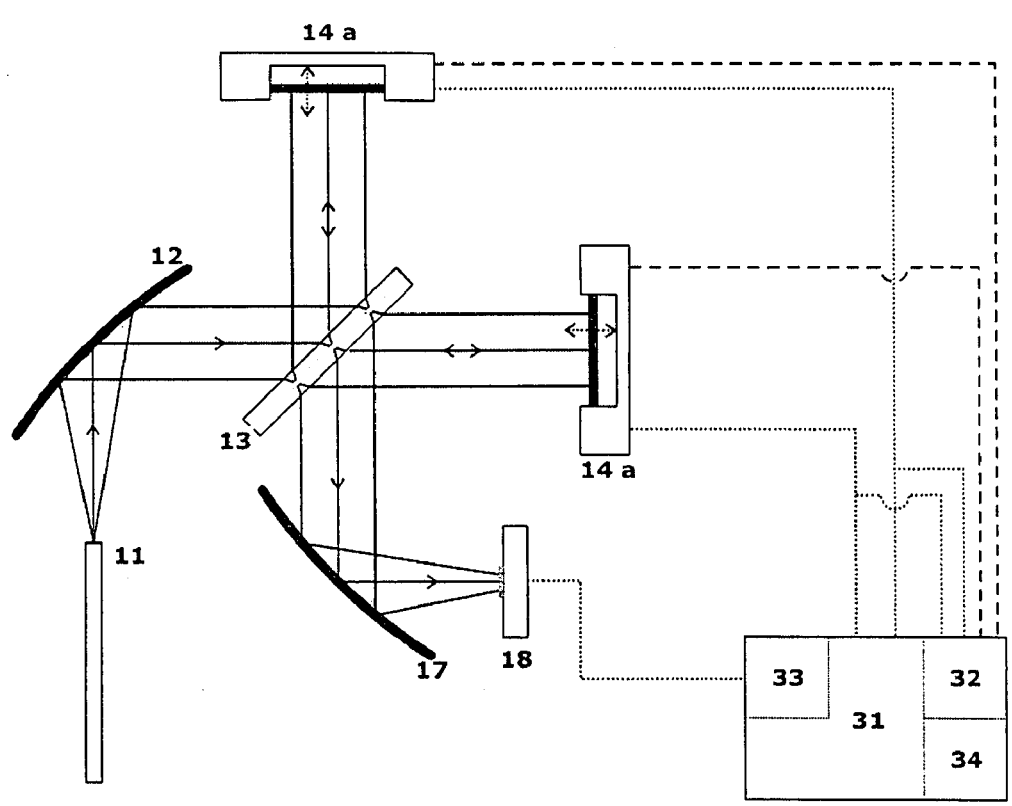
FIG. 3 shows a possible embodiment of the arrangement according to the invention using two oscillating micromechanical translation mirror components that are optically accessible on one side, whereby for simultaneous modulation of the radiation in the two interferometer arms, the latter are located in a synchronously oscillating state with a fixed phase shift of preferably 180°.

In the third basic arrangement as is shown in FIG. 3, two micromechanical translation mirror modules are used that are operated synchronously with a fixed phase shift of 180°. In this way, an effect analogous to that achieved by using the above-described arrangement can be obtained, even without a micromirror, with a surface that is highly mirrored on both sides. The interrogation of the mirror position data can take place in such an arrangement selectively via (i) position sensors that are integrated into the micromirror module, (ii) a reference laser interferometer that is modulated in two arms, or (iii) a combination of these methods.

Figure 4:
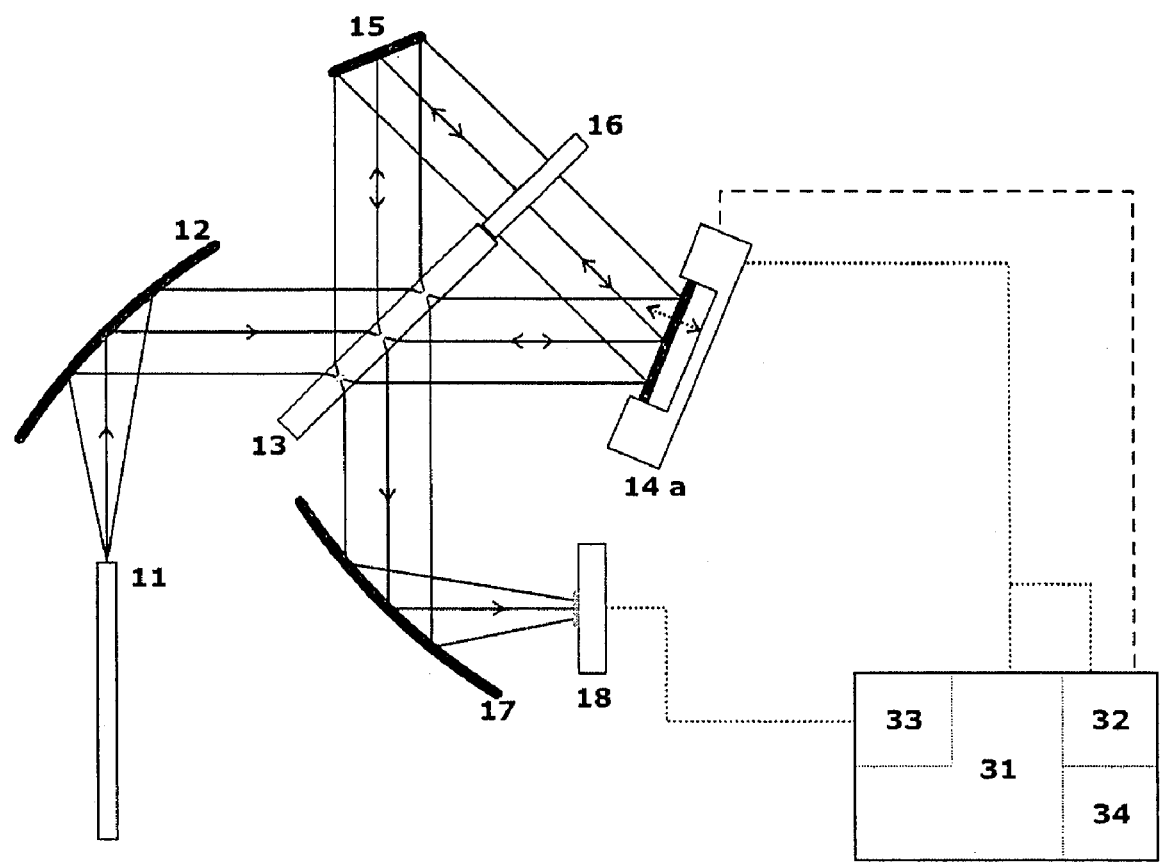
FIG. 4 shows a modification of the embodiment of the arrangement according to the invention, shown in FIG. 1a, using a special arrangement of the optical components of the interferometer for the purpose of increasing the effective optical path difference and thus improving the attainable optical resolution.

To further improve the optical resolution capacity of the interferometer, the use of special optical arrangements to increase the effective optical path difference is advantageous. By using optical miniature and micro-components, in particular the use of a beam guidance with two-fold use of the mirror displacement, as shown in FIG. 4 as modification of the arrangement of FIG. 1a according to the invention, is useful and purposeful. The direct beam path from beam splitter (13) to the micromechanical translation mirror (14a, 14b) is replaced by an acute beam guidance, in which the translation mirror (14a, 14b) acts at the same time as the deflecting mirror between the beam splitter (13) and a locally fixed mirror (16). In such an arrangement, the translation displacement of the micromechanical mirror has a twofold use, which increases the effective optical path difference and thus improves the optical resolution capacity of the interferometer. Advantageously, the second interferometer arm is applied mirror-symmetrically, whereby instead of the micromechanical mirror, another locally fixed mirror (15) is used. Such a modification can also be used analogously to increase the effective resolution for the embodiments of the arrangement according to the invention, shown in FIG. 1b, FIG. 2 and FIG. 3.

The underlying beam path according to the principle of a standard Michelson dual-beam interferometer with beam splitter is common to all arrangements. For the miniaturized structure according to the invention, it is advantageous to arrange the interferometer in the beam path behind the sample to be examined. As a result, the occurrence of technical problems that can be produced from the presence of a heat source (radiation source) in direct proximity with a spectrometer that is made highly compact can be avoided in a simple way. The optical radiation is routed either directly or, for example, via fiber optics (11) into the spectrometer, made parallel via suitable entrance optics (12) and projected into the spectrometer. On a spectrally suitable miniaturized beam splitter (13), the beam is broken down into two 50% component beams and routed into the two interferometer arms. In the latter, the radiation, according to the chosen arrangement, is reflected back modulated by one or two micromechanical components (14a, 14b), undergoes interference on the beam splitter (13) with radiation from the other interferometer branch in each case, and is routed via collimation optics (17) to a detector (18). Arrangements with a 90° or a 600/1200 interferometer beam geometry have proven advantageous, but also other geometries are conceivable and feasible for specific applications and requirements. Operation of the micromechanical mirror takes place via application of voltage to the coplanar comb electrodes that are integrated into the component.

Depending on the application and the component, micromechanical mirrors can be operated (i) with an induced oscillation frequency near the resonance frequency of the component or (ii) in resonance. In the case of induced excitation with a given oscillation frequency, this frequency is determined by the mirror control (32) and can be varied over a certain range. In the case of the resonant mirror excitation, the frequency is fixed by the component; for this purpose, higher deflections of the micromechanical translation-oscillation mirror are possible. The feedback of the oscillation state that is necessary for the resonant operator takes place preferably via sensors that are integrated into the micromechanical oscillation mirror, for example on a capacitive basis, and that detect the mirror position at least twice per complete oscillation and transmit it to the mirror control (32).

For an inverse Fourier transform of the interferograms that have been recorded on the detector (18), correlation with the mirror position is necessary. This takes place in standard devices preferably via a laser beam that is coupled in parallel to the IR beam path. This arrangement, although possible in principle, is disadvantageous in the objective case since in this way significant portions of the surface area of the micromechanical mirror are not available for the information signal. Advantageously, therefore, a micromechanical mirror (14b) that is optically accessible on both sides is used; its front is used as a movable mirror for the information signal in the infrared and its back as a movable mirror for the laser reference interferometer. In this case, the reference interferometer consists advantageously of a wavelength-stabilized laser diode (21), preferably in the visible spectral range, a spectrally suitable beam splitter (22) and a corresponding detection unit (24), for example a silicon avalanche photodiode "(Si-APD)," as well as optionally a stationary mirror (23), as shown in FIG. 1b by way of example.

As an alternative to optical position determination, sensors integrated into the micromechanical oscillation mirror, as are also necessary, for example, for resonant mirror guidance, can be used. By knowing the oscillation behavior of the micromechanical component in combination with the determination of the mirror position at least twice per oscillation period, the mirror position can be electronically determined with accuracy that is sufficient for a plurality of applications.

For special applications, moreover, a combination of the two methods for position determination is possible.

For example, an InGaAs detector element for the near infrared or a preferably cooled HgCdTe detector for the mid-infrared, each with time dynamics matched to the mirror frequency, can be used as detectors (18). Depending on the application, the cooling can be liquid nitrogen cooling, thermoelectric cooling or a closed-circuit cryogenic refrigerating machine, especially according to the principle of a Stirling cooler. The electronic components (33) that are necessary for operating the detector, especially a preamplifier that is tuned to the detector, and an analog/digital signal converter that is matched to the dynamic range, are advantageously integrated into the spectrometer electronics.

The control is implemented advantageously by means of integrated electronics with one or more application-specific, programmed digital signal processors (DSP) and in addition to the control (32) of the micromechanical mirror (14), it preprocesses the signals of the detector (18) in an initial stage (33) and relays them to internal data processing (31). The internal data processing correlates in sequence the detector data with the mirror position data, and transforms the path-dependent interferogram into power spectra by suitable transformation and correction algorithms, for example for compensation of the nonlinear mirror motion during the scanning process at the greatest possible mirror travel use and/or mirror deformation during the movement. These power spectra are then transmitted via a suitable electronic interface (34), preferably a serial interface according to the USB standard, to a higher-order system, for example a PC.

For the operation of the micromechanical translation mirror used according to the invention, it is necessary to operate the mirrors in a vacuum of typically=10 mbar. In this respect, it is possible and useful to make vacuum-tight the entire housing that comprises the spectrometer, as well as optionally also the detector element and/or the electronic equipment or parts of the electronic equipment and to operate at a pressure that is less than the maximum allowable operating pressure. As an alternative, it is possible to pack only the micromechanical translation mirror element (14a, 14b) into a vacuum-tight housing. In this case, this housing is to be equipped with windows that are transparent for the respective wavelength range, whereby preferably windows with an antireflective coating that is optimized for the wavelength range that is to be transmitted are used. In the case of the embodiment according to the second design cited, it is advantageous, in a way similar to the prior art commonly used for large FT-IR devices, to integrate into the housing of the device a preferably easily removable cartridge with a dessicant to remove humidity.

In summary, it can be noted that using the geometries shown in FIGS. 1 to 4 or derived therefrom, it is possible for the first time to implement a practicable FT spectrometer for the near-and/or mid-infrared using micromechanical translation mirror components. In this case, the harmonically oscillating micromechanical translation mirror components that are used according to the invention satisfactorily assume the function of known movable mirrors. By using an almost massless microcomponent as is proposed according to the invention, arrangements with much smaller size as well as a mirror modulation frequency that is several orders of magnitude higher compared to conventional systems can be achieved. The arrangement according to the invention can be used in a wide area of use, whereby reference is made especially to its use in optical spectroscopy.

The invention claimed is:

1. An arrangement for a compact Fourier transform interferometer for optical radiation according to one of the Michelson principle and a principle derived therefrom, comprising:
    a micromechanical translation mirror having two sides, an effective oscillation amplitude of at least 50 µm, and a usable mirror surface area of at least 1 mm$^2$,
    the micromechanical translation mirror being optically accessible on one side, and
    the micromechanical translation mirror being translationally displaceable; and
    two interferometer arms, wherein,
    optical modulation of radiation in at least one of the interferometer arms is produced by translational displacement of the micromechanical translation mirror.

2. Arrangement according to claim 1, further comprising:
    a beam splitter; and
    a locally fixed mirror, wherein the one micromechanical translation mirror is arranged in an acute beam guidance between the beam splitter and the locally fixed mirror to provide a twofold use of the oscillation amplitude of the micromechanical translation mirror.

3. An arrangement according to claim 1, wherein,
    the micromechanical translation mirror is optically accessible on both of the two sides, and
    simultaneous optical modulation of the radiation in the two interferometer arms is produced by the micromechanical translation mirror.

4. An arrangement according to claim 1, further comprising:
    another micromechanical translation mirror,
    the micromechanical translation mirror being separate from the another micromechanical translation mirror, wherein,
    the micromechanical translation mirror and the another micromechanical translation mirror oscillate synchronously with a constant phase shift of 180°, and
    the micromechanical translation mirror and the another micromechanical translation mirror provide simultaneous modulation of the radiation in the two interferometer arms.

5. An arrangement according to claim 1, further comprising:
    an evaluation unit;
    a beam path;

a reference laser interferometer with a frequency-stabilized and temperature-stabilized laser diode, a beam splitter, and a photodiode (24) that measures modulated laser radiation, wherein the micromechanical translation mirror is optically accessible on both of the two sides, the micromechanical translation mirror is movable in the beam path the modulated laser radiation measured on the photodiode is transmitted, as a time-dependent position determination signal of the micromechanical translation mirror, to the evaluation unit.

6. The arrangement according to claim 5, wherein the laser diode is frequency and temperature-stabilized for the visible spectral range.

7. An arrangement according to claim 1, further comprising:

an evaluation unit;

a mirror control for controlling the micromechanical translation mirror;

a sensor, integrated into the micromechanical translation mirror, said sensor configured to detect one of the position and the phase relation of the micromechanical translation mirror at least twice per oscillation period, wherein, sensor data is transmitted to at least one of the mirror control and the evaluation unit to provide a signal for time-dependent position determination of the micromechanical translation mirror.

8. The arrangement according to claim 7, wherein said sensor is a capacitive through-way sensor.

9. An arrangement according to claim 1, further comprising:

a mirror control for controlling the micromechanical translation mirror, wherein said micromechanical translation mirror is configured to oscillate at a frequency specified by the mirror control, said frequency within a range from 0.2 kHz to 20 kHz.

10. The arrangement according to claim 9, wherein the frequency is near 1 kHz, close to a component-dependent resonance frequency of the micromechanical translation mirror.

11. An arrangement according to claim 1, further comprising:

a mirror control for controlling the micromechanical translation mirror; wherein the micromechanical translation mirror is configured to resonantly oscillate.

12. The arrangement according to claim 11, further comprising:

a position sensor, integrated with the micromechanical translation mirror, to provide data of an oscillation state of the micromechanical translation mirror linked to a characteristic oscillation behavior of the micromechanical translation mirror.

13. An arrangement according to claim 1, further comprising:

a detector with time behavior matched to a frequency of the oscillation of said micromechanical translation mirror, to provide detection of radiation modulated by said translational displacement of said micromechanical translation mirror as an electronic signals.

14. An arrangement according to claim 13, further comprising:

a control of the micromechanical translation mirror;

a recording apparatus to record signals detected by the detection unit;

at least one electronic device configured to process the electronic signals from the detector and a position of said micromechanical translation mirror into a spectrum ; and at least one interface, configured to connect said electronic devices to a subsequent system.

15. The arrangement according to claim 14, wherein said at least one electronic device is based on at least one digital signal processor.

16. The arrangement according to claim 14, wherein said at least one interface is compliant with the USB standard.

17. The arrangement according to claim 13, wherein said radiation detector is one of a cooled HgCdTe detector for mid-infrared radiation and an InGaAs detector for near-infrared radiation.

18. The arrangement according to claim 1, further comprising:

a silicon spring; and a comb electrode coplanar to said silicon spring, said micromechanical translation mirror being suspended on said silicon spring, and said silicon spring configured to oscillate electrostatically in a direction normal to the plane of said mirror surface upon operative excitation of said comb electrode.

* * * * *